United States Patent [19]

Wright

[11] Patent Number: 4,995,335
[45] Date of Patent: Feb. 26, 1991

[54] ANIMAL RESTRAINT CAGE

[76] Inventor: John H. Wright, 6608 Flying Cloud Dr., Eden Prairie, Minn. 55344

[21] Appl. No.: 579,890

[22] Filed: Sep. 10, 1990

[51] Int. Cl.$^5$ .............................................. A01K 1/06
[52] U.S. Cl. .................................... 119/98; 119/147.1
[58] Field of Search ......................... 119/98, 99, 147.1

[56] References Cited

U.S. PATENT DOCUMENTS

| | | | |
|---|---|---|---|
| 1,348,093 | 7/1920 | D'Egilbert et al. | 119/98 |
| 2,616,392 | 11/1952 | Hutchings | 119/98 |
| 2,703,554 | 3/1955 | Haggard et al. | 119/99 |
| 2,786,449 | 3/1957 | Dahlerup | 119/99 |
| 4,201,158 | 5/1980 | Parker | 119/98 |
| 4,432,305 | 2/1984 | Vernese | 119/98 |
| 4,531,478 | 7/1985 | Forrest | 119/98 |
| 4,787,339 | 11/1988 | Heirer, Jr. | 119/98 |

*Primary Examiner*—Paul J. Hirsch
*Attorney, Agent, or Firm*—Haugen and Nikolai

[57] ABSTRACT

An animal restraint cage which comprises a generally rectangular frame equipped with a pair of side panels and stanchion securing means to restrainably retain an animal therewithin. The side panels are adjustably positioned laterally within the frame and are provided with means for tightening the side panels together, such as by means of a winch block or the like. The stanchion means comprises a pair of spaced apart rod members which are designed to contact the restrained animal at a point adjacent the top of the neck and behind the base of the skull. The side panels are provided with axially aligned bores to receive restraint rods to prevent upward movement or jumping of the animal when positioned within the means. If desired, a ramp may be removably positioned between the ground and the platform of the restraint for elevating an animal accessing the restraint.

5 Claims, 4 Drawing Sheets

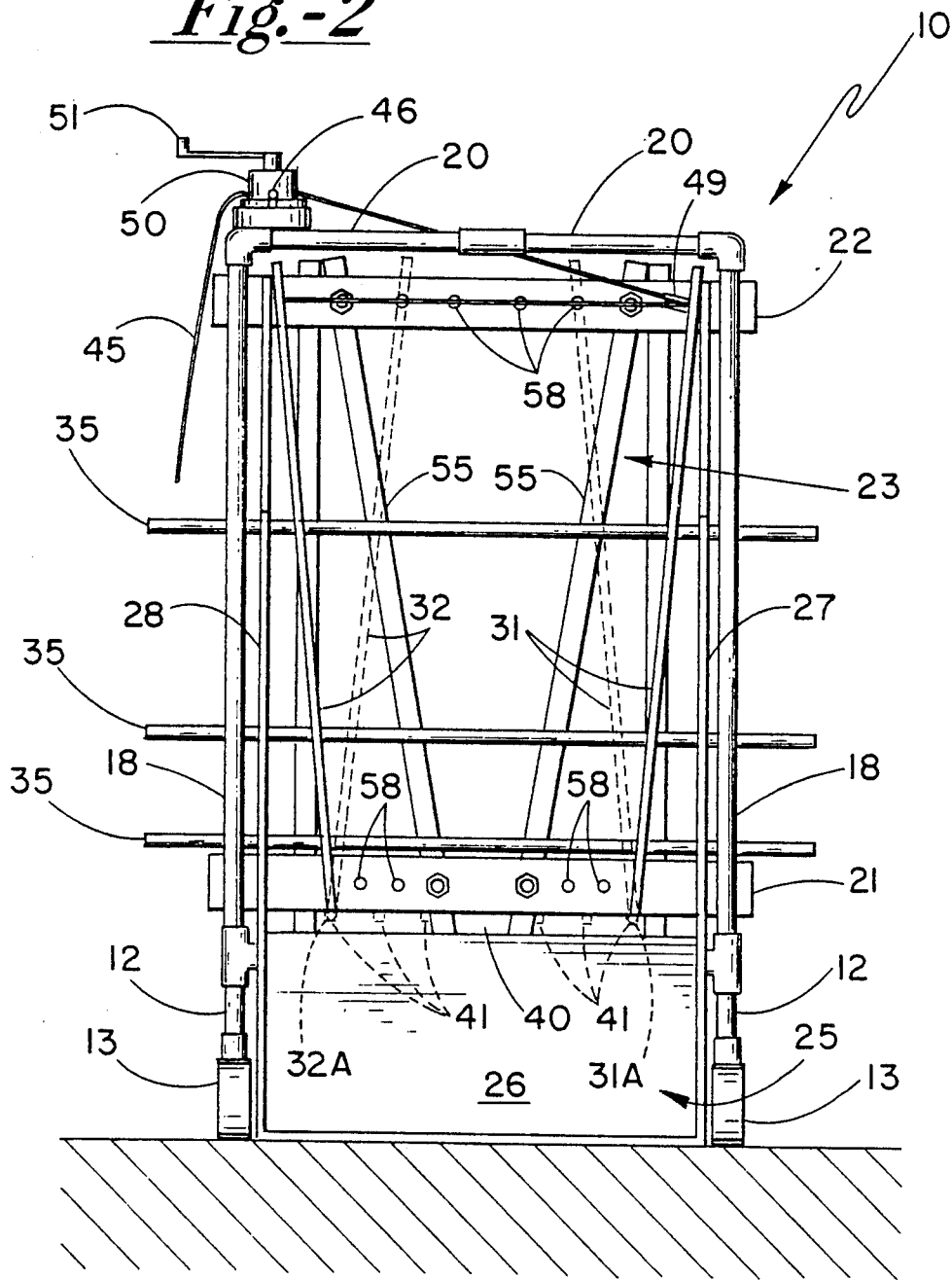

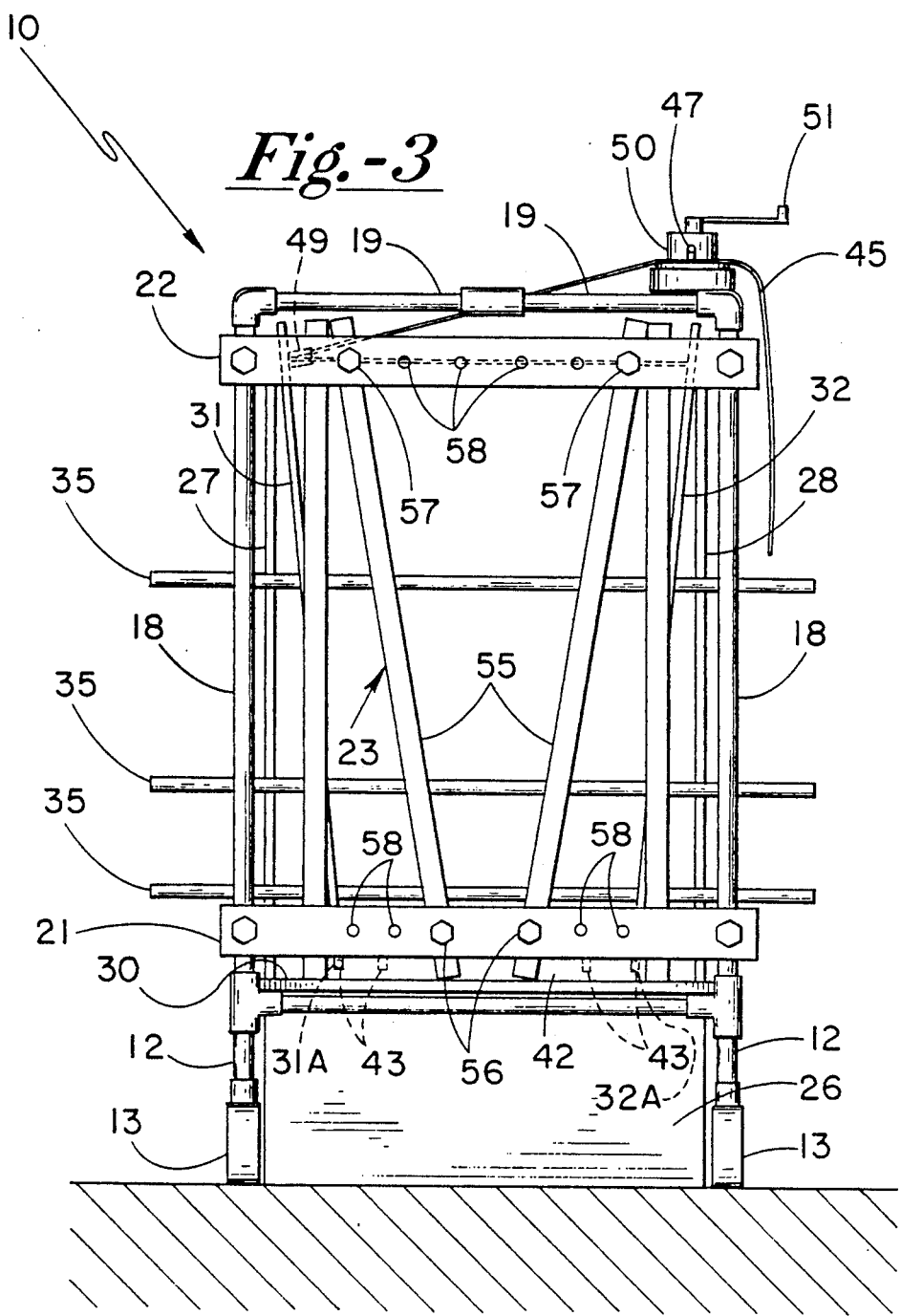

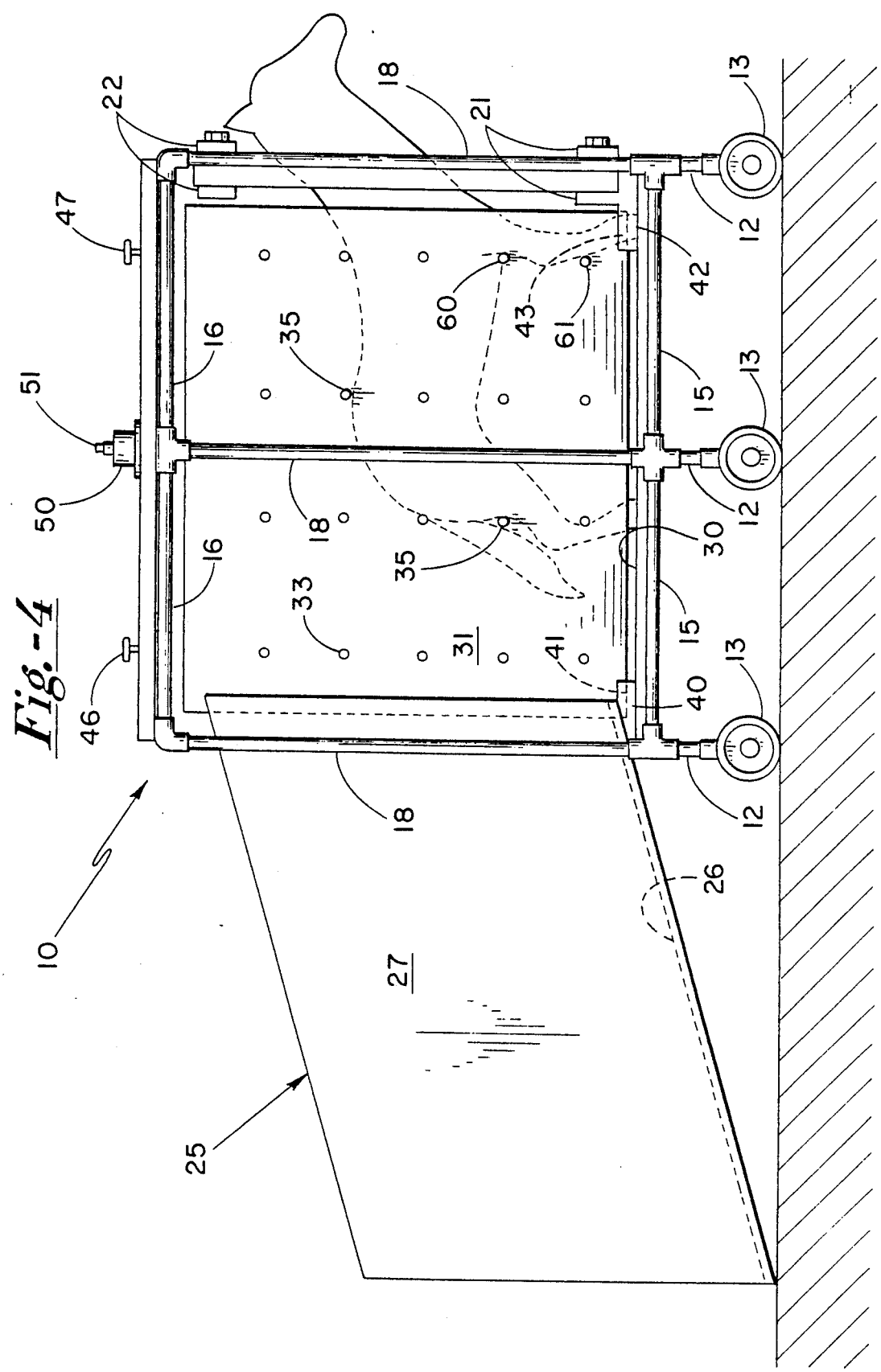

ANIMAL RESTRAINT CAGE

BACKGROUND OF THE INVENTION

The present invention relates generally to an improved animal restraint means, and more particularly to an animal restraint means which is designed to gently and controllably restrain an animal for predetermined periods of time. The restraint is designed primarily for veterinary use, and provides a gentle means for temporarily confining an animal undergoing one or more veterinary procedures. The animal restraint means of the present invention is particularly adapted to temporarily confining animals undergoing procedures wherein invasive devices such as needles or the like are necessarily employed. The arrangement is particularly well adapted for use with animals having rowdy or generally uncontrollable dispositions.

In certain other applications, the animals may be restrained while undergoing vaccination, inoculation, and artificial insemination as well.

In the past, various restraint means including cages, pens and the like have been employed for assisting veterinarians while undertaking procedures with animals. It has been found that certain of these restraints are less than gentle upon the animals, and their ability to recall may render the animals difficult to effectively restrain on subsequent or repeat occasions. It is, of course, always important to provide a means of protecting the individual attending the animal, and it is also equally important to avoid injuring or wounding the animal or otherwise inflicting damage to their bodies, including their bones, flesh, organs including skin, and fur.

The animal restraint means of the present invention includes a frame means, preferably fabricated of metallic tubing, with the frame being provided with means for receiving auxiliary components including a floor, side panels, access ramp, and stanchion means. Each of these components functions to assist the animal in gaining access to the restraint means, and also for effectively restraining and confining the animal while disposed therewithin. For purposes of utilization in typical veterinary clinics treating domestic animals such as domesticated dogs or other smaller beasts, the restraint means is provided with casters or wheels to permit alternate movement between an in-use location and an inactive or storage location.

It is, of course, appropriate to consider designing and constructing animal restraint cages in accordance with the present invention which are sized to accommodate smaller domestic animals including dogs as well as sheep, and other species.

Therefore, it is a primary object of the present invention to provide an improved animal restraint means which is provided with means for gently holding or restraining an animal therewithin while undergoing typical veterinary procedures.

It is a further object of the present invention to provide an improved animal restraint means which is capable of restraining animals of various sizes and dispositions, including relatively small animals and larger animals including the larger breeds of dogs and the like.

It is yet a further object of the present invention to provide an improved animal restraint means which is readily serviced, set up, and cleaned as required.

Other and further objects of the present invention will become apparent to those skilled in the art upon a study of the following specification, appended claims, and accompanying drawings.

IN THE DRAWINGS

FIG. 2 is an end elevational or rear view taken along the line and in the direction of the arrows 2—2 of FIG. 1;

FIG. 3 is an end view of the forward or stanchion end of the restraint means taken along the line and in the direction of the arrows 3—3 of FIG. 1; and FIG. 4 is a side elevational view taken along the line and in the direction of the arrows 4—4 of FIG. 1 and illustrating the apparatus with an animal such as a dog restrained within the apparatus.

DESCRIPTION OF THE PREFERRED EMBODIMENT

Figure 1:
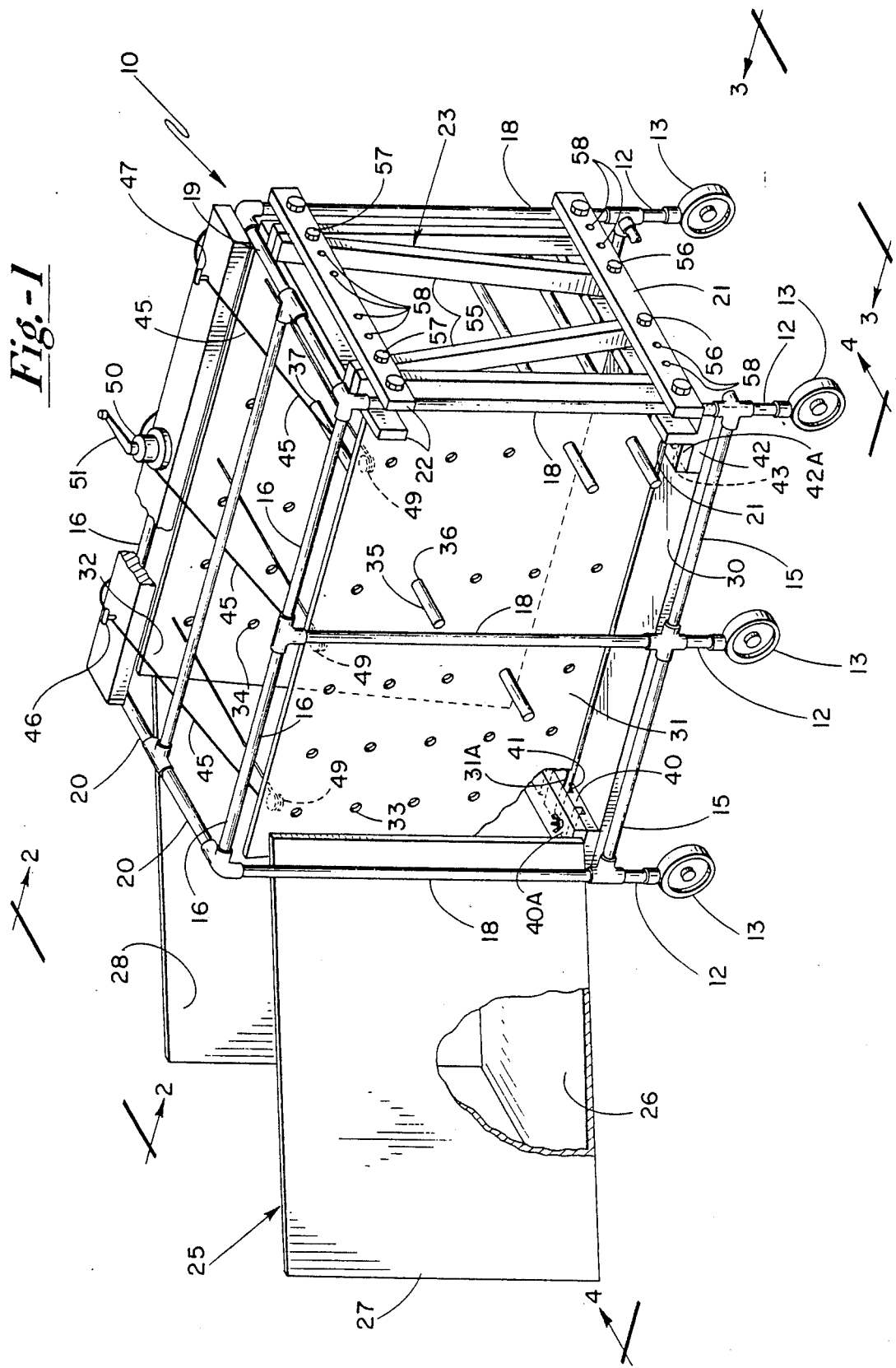
FIG. 1 is a perspective view showing the animal restraint means of the present invention in operative and unloaded conditions and with one side panel being partially broken away to illustrate features of the device, and with a portion of the front frame cross-member being partially broken away.

In accordance with the preferred embodiment of the present invention, and with particular attention being directed to FIG. 1 of the drawings, the animal restraint means generally designated 10 includes a frame means defining a generally rectangular parallelepipedon, and having various vertical posts and horizontal rods coupled together to form the configuration of the parallelepipedon. The frame means includes base posts as at 12—12 which are adapted to receive casters or other wheeled elements as at 13—13, and which are coupled to appropriate inter-coupling members to provide an appropriate retention for horizontal base side rods 15—15 and upper side rods 16—16. Vertical posts are provided as at 18—18 to couple and appropriately space horizontal rod members 15—15 and 16—16, one from another. End rods 19 are provided in a pair of segments, and rear or access end rods 20—20 are provided for defining and delineating the access opening to the restraint cage. At the forward end of the restraint means are a pair of lower horizontal members 21—21, along with a pair of upper rods 22—22, with the elements 21—21 and 22—22 cooperating to form a stancion securing means which is at the forward end of the restraint means and which is shown or described generally at 23. The stanchion securing means will be more fully described in greater detail hereinbelow.

Adjacent the access end of the restraint means there is provided a ramp receiving means shown generally at 25. With continued attention being directed to FIG. 1 of the drawings, and with attention also being directed to FIG. 2, the ramp means includes an inclined base member as at 26, together with a pair of ramp side walls 27 and 28. The inclined ramp member 26 together with the side walls 27 and 28 are arranged to be removably positioned between the ground and the base platform plane of the frame means. The base platform plane of the restraint means is, of course, defined by a bottom platform disposed within the restraint means and shown at 30 (FIG. 4). It will be appreciated that the inclined ramp is provided in order to permit ease of access for the animal to be restrained into the access end of the restraint, as well as for elevating an animal to a desired elevation within the apparatus.

A pair of side walls are provided for the restraint means, with the side walls being shown at 31 and 32.

The side walls are removably positioned between side planes of the frame, and have axially aligned pairs of bores formed therein, such as, for example, at 33 and 34 respectively. Along the bottom edge of each of the side walls 31 and 32 is secured a rod member such as 31A and 32A respectively. The rods 31A and 32A may be secured to the side walls by any conventional means, such as a length of strap metal which is secured to the body of the walls 31 and 32 by means of conventional bolts or the like. The purpose of the axially aligned pairs of bores such as bores 33 and 34 forming such a pair are to releasably receive restraint rods therewithin, with a typical restraint rod being shown within the bores as at 35. The restraint rods are utilized to control, limit, and otherwise restrain upward movement of an animal confined within the restraint means. While the bores 34 and 35 are shown as being disposed adjacent the rear of the restraint cage, similar pairs of axially aligned bores are formed forwardly of the device as well, with singular ones of such bore pairs being shown at 36 and 37, for example. The positioning of the bore pairs is such that means can be placed across the restraint cage for restraining upward movement of a restrained animal. Slotted openings or means may be employed for certain purposes as well.

It has been found that animals do not move, jump, or otherwise thrash about when the extent of upward movement is restrained, confined, or otherwise limited.

Locking means are disposed generally along the base platform plane defined by floor panel 30 for receiving the base edge surfaces of each of said side walls within said frame means at predetermined spaced-apart relationship. These means are in the form of slots formed within base cross member 40 (FIG. 1) with such slots being shown as formed within cross member 40 at 41. A similar set of slots is formed within forward cross member 42 as at 43, for example. The side walls or panels 31 and 32 are releasably secured to the ends of the restraint means 10 by having rods 31A and 32A engage the individual slots such as slots 42 and 43, and become lockingly engaged therein by adjustably removable hold-down plates 40A and 42A. Hold-down pads or plates 40A and 42A are secured in place by means of bolts and wing nuts, as illustrated in FIG. 1. The bolts pass through members 40 and 42, and the wing nuts are utilized to releasably attach the hold-down members 40A and 42A in place. In this connection, therefore, the generally upright side walls may be positioned to define the width of the confining compartment formed within the restraint means. In this fashion, the base edge surfaces of each of the side walls 31 and 32 are positioned within the frame means as predetermined spaced-apart relationship, thereby defining the width of the animal restraint cavity or the like.

Means are provided along the upper surfaces of the panels 31 and 32 for snugging and releasably securing the upper edge surfaces of each of the side walls in position about the opposed sides of an animal held within the animal receiving cavity. These means, as illustrated in FIG. 1, include a line traveling about a path defined by a number of pulleys, and having the ends cleated in place and moved and snugged by winch means. A line such as line 45 is provided with the ends cleated on cleats 46 and 47, with the tortuous pattern of the line 45 being controlled by positioning pulleys 49—49 therealong.

In order to provide for effective snugging of line 45, winch block 50 having winch handle 51 operatively coupled thereto is conveniently provided along the upper surface of the side wall 32. Conventional marine winch blocks may be employed, and are easily cleaned and maintained because of their durable construction.

Attention is now directed to the forward end of the restraint means for a description of the stanchion means 23. The stanchion means 23 comprise a pair of laterally spaced-apart rod or post members 55—55, fabricated from wood or steel, with these rod members having locking means for releasably securing the rods to the frame means for contrallable adjustable positioning. The lower ends of the rods 55—55 are preferably secured to the cross member 21 by through-bolts 56—56, with the upper ends being pivoted by motion of the side walls or panels 31 and 32, or alternatively adjustably secured in place by through-bolts 57—57. Appropriate upper and lower spaced-apart bore pairs are provided and shown at 58—58.

In order to continue the quiet holding or retention of the animal, and with particular reference to FIG. 4, one or more restraint rods are conveniently placed behind the front legs of the animal, such as in the areas shown at 60 and 61. Such modes restraint, when coupled with the utilization of the stanchion means assists in calming and otherwise restraining the animal.

As an alternative means for retaining the animal along the spinal area at the top of the back, one or more restraint rods may be positioned over the animal in a variety of means. In certain instances, it may be possible to restrain the animal along the top of the back by a plurality of parallel spaced restraint rods held or pressed downwardly against the animal, and adjacent or immediately above the animal retaining cavity.

While the apparatus illustrated herein has been shown in the form of utilizing panels 31 and 32 in the form of solid panels, it will be noted that an alternative structure may utilize a series of orthogonally positioned rods including vertical rods and horizontal rods. As may be conveniently utilized for veterinary procedures and practices, the vertical rods are preferably $\frac{1}{4}$ inch in diameter with a center-to-center spacing of $1\frac{3}{8}$th inches. This spacing is appropriate to provide the best protection for the animals confined therein and is the most desirable width for dogs. The horizontal cross-members are generally arranged in heavier gauge at the bottom, and than on the upper end. Four to six horizontal rods may be employed. Cross-members of rectangular cross-section may be employed, if desired.

In any of these arrangements, it is possible to arrange for vaccination through ports, openings, hinged or removable panels or the like. Vaccinations procedures may be undertaken upon removal of covers, or upon use of previously-formed bores of convenient and appropriate size.

While the most convenient working height for devices of this type is approximately 20 inches from the floor, it will be appreciated that an optional shelf may be employed to assist in providing the appropriate working height for the animal, or alternatively to provide a shelf for storage of necessary articles. Also, for certain procedures, it may be helpful to provide a removable step or the like on the side or front of the restraint assembly in order to gain access to the restrained animal, and also be able to observe the animal from above.

It will be appreciated that various modifications may be made to the animal restraint cage and means illustrated without actually departing from the spirit and the scope of the invention.

What is claimed is:

1. In an animal restraint means comprising in combination, frame means defining a generally rectangular parallelepipedon and having an elevated base platform plane, a top plane, opposed side planes and opposed end planes, an open animal access port arranged at one end and a stanchion securing means disposed at the opposed end thereof, said animal restraint means being characterized in that:
   (a) ramp receiving means removably positioned between the ground and said base platform plane at said access end for elevating an animal accessing said animal restraint means;
   (b) side wall plates removably positioned between said side planes and having axially aligned pairs of bores formed therein for releasably receiving restraint rods therewithin for restraining upward movement of an animal positioned within said animal restraint means;
   (c) locking means disposed generally along said base platform plane and secured to said frame means for receiving the base edge surfaces of each of said side wall plates within said frame means in predetermined spaced-apart relationship, and means for snugging and releasably securing the upper edge surface of each of said side wall plates in position about the opposed sides within said animal restraint means; and
   (d) said stanchion securing means comprising a pair of laterally spaced-apart rod members and having locking means for releasably securing said rods to said frame means for the adjustable positioning of said rods to form said stanchion means.

2. The animal restraint means as defined in claim 1 being particularly characterized in that said ramp means is provided with a pair of opposed side walls for guiding an animal entering said animal restraint means.

3. The animal restraint means as defined in claim 1 wherein said frame means is fabricated from tubing.

4. The animal restraint means as defined in claim 3 wherein said tubing comprises metallic tubing.

5. The animal restraint means as defined in claim 1 wherein being particularly characterized in that said side wall plates include axially aligned pair of bores for restraining forward and rearward movement of an animal within said animal restraint means.

* * * * *

UNITED STATES PATENT AND TRADEMARK OFFICE
CERTIFICATE OF CORRECTION

PATENT NO. : 4,995,335
DATED : February 26, 1991
INVENTOR(S) : John H. Wright

It is certified that error appears in the above-identified patent and that said Letters Patent is hereby corrected as shown below:

ON THE TITLE PAGE:

Item [56] References Cited, please add the following:

| | | | |
|---|---|---|---|
| 1,447,835 | 3/1923 | Coats | |
| 1,764,522 | 6/1930 | Primm | |
| 2,229,588 | 1/1941 | Parker | 119/98 |
| 3,237,602 | 3/1966 | Rens | 119/98 |
| 4,444,150 | 4/1984 | Hueftle et al | 119/27 |
| 4,574,741 | 3/1986 | Mahler | 119/98 |

Column 6, line 21, delete the word "wherein".

Signed and Sealed this

Twenty-eighth Day of July, 1992

Attest:

DOUGLAS B. COMER

Attesting Officer

Acting Commissioner of Patents and Trademarks